United States Patent [19]

Shibutani et al.

[11] Patent Number: 5,239,606
[45] Date of Patent: Aug. 24, 1993

[54] OPTICAL CONNECTOR COMPRISING AN OPTICAL CONNECTION ADAPTER WITH MEANS FOR CONNECTION/DISCONNECTION OF AN OPTICAL CONTACT

[75] Inventors: Michitomo Shibutani; Tsuyotake Sawano; Yoshitaro Sato; Masaru Kurisaka, all of Tokyo, Japan

[73] Assignees: Japan Aviation Electronics Industry, Limited; NEC Corporation, both of Tokyo, Japan

[21] Appl. No.: 793,993

[22] Filed: Nov. 18, 1991

[30] Foreign Application Priority Data

Nov. 19, 1990 [JP] Japan .................................. 2-311324
Nov. 29, 1990 [JP] Japan ............................. 2-125232[U]
Mar. 5, 1991 [JP] Japan .................................... 3-62458

[51] Int. Cl.$^5$ ............................................. G02B 6/36
[52] U.S. Cl. ..................................................... 385/89
[58] Field of Search ................ 385/53, 66, 70, 88-90, 385/134

[56] References Cited

U.S. PATENT DOCUMENTS

| | | | |
|---|---|---|---|
| 4,167,303 | 9/1979 | Bowen et al. | 385/89 |
| 4,182,546 | 1/1980 | Lukas et al. | 385/70 X |
| 4,737,008 | 4/1988 | Ohyama et al. | 385/89 X |
| 4,779,952 | 10/1988 | Hayashi et al. | 385/66 |
| 4,828,353 | 5/1989 | Yamaguchi et al. | 385/66 X |
| 5,069,524 | 12/1991 | Watanabe et al. | 385/89 |

FOREIGN PATENT DOCUMENTS 0297765 1/1989 European Pat. Off. .
0430107 6/1991 European Pat. Off. .

*Primary Examiner*—Akm E. Ullah
*Attorney, Agent, or Firm*—Laff, Whitesel, Conte & Saret

[57] ABSTRACT

An optical connector comprises an optical connection adapter and an optical plug. The optical connection adapter includes a sleeve to be attached to a first circuit board. The optical plug includes an optical contact to be inserted into and removed from the sleeve, and a contact holding member to be attached to a second circuit board. A variation of the optical connector comprises an optical connection adapter and an optical socket. The optical connection adapter comprises a pipe, an optical fiber arranged in the pipe, an optical connector connected to opposite ends of the optical fiber, and a contact holding member which is inserted into the pipe to be movable along the cylindrical axis and which is for holding the optical contact. The optical socket comprises a socket housing which has an insertion hole for removably receiving the optical contact and which is to be attached to the second circuit board, and a mating optical contact which is fixed to the socket housing and which is to be brought in to contact with the optical contact through the insertion hole.

17 Claims, 18 Drawing Sheets

OPTICAL CONNECTOR COMPRISING AN OPTICAL CONNECTION ADAPTER WITH MEANS FOR CONNECTION/DISCONNECTION OF AN OPTICAL CONTACT

BACKGROUND OF THE INVENTION

This invention relates to an optical connector for use in a communication apparatus or the like and, in particular, to an optical connector comprising an optical connection adapter with means for connection/disconnection of an optical contact.

generally, a recent communication apparatus includes a plurality of circuit boards. For interconnection between those circuit boards, use is made of an optical connector in addition to an electrical connector, as shown in FIG. 1.

Referring to FIG. 1, a printed wiring board 1 has the opposite surfaces each of which is for mounting a circuit board 2 to be arranged perpendicular to the printed wiring board 1. The printed wiring board 1 is provided with an electrical connector 3 so as to interconnect the circuit boards 2 on the opposite surfaces.

The circuit boards 2 are also connected through an optical connector. The optical connector comprises an optical plus 6 and an adapter 7 attached to the printed wiring board 1. An optical cable 5 is connected to each optical plug 6. The optical cable 5 is also connected to a converter 4 placed on each circuit board 2. The adapter 7 serves to facilitate interconnection between the optical plugs 6.

However, the optical connector illustrated in FIG. 1 is a so-called single core connector having one optical contact 8. Therefore, a relatively wide space is required for connection of one optical connector. Consequently, such a conventional optical connector is not suitable for connection of a plurality of connectors. In addition, the conventional optical connector is disadvantageous in that it takes a lot of labor for mounting operation.

SUMMARY OF THE INVENTION

It is therefore an object of this invention to provide an optical connector which requires a relatively small space per one optical connector and which can improve efficiency in mounting operation.

According to this invention, an optical connector unit is obtained which comprises an optical plug comprising an optical contact connected to an optical cable, a contact holding member for holding the optical contact, and a housing for supporting the contact holding member to be movable along an optical axis of the optical contact, and an optical connection adapter to be attached to a circuit board for holding the optical plug. The optical connection adapter includes a main housing to be attached to the circuit board and optical contact driving means movable in the main housing and engaged with the contact holding member for driving the contact holding member along the optical axis.

The optical contact driving means is a slider having a groove engaged with the contact holding member so as to drive the contact holding member along the optical axis.

The main housing is provided at a portion adjacent to the circuit board with a sleeve for removably receiving the optical contact.

According to another aspect of this invention, an optical connection adapter is obtained which comprises a pipe to be attached to a through hole of a circuit board so as to extend from one surface to other surface of the circuit board, an optical fiber inserted into the pipe, a first and a second optical contact connected to opposite ends of the optical fiber, respectively, and a first and a second contact holding member for holding the first and the second optical contacts, respectively, and coupled to the pipe to be movable along a cylindrical axis of the pipe. The optical connection adapter is mated with a first and a second optical socket to form an optical connector.

The first optical socket comprises a first housing provided with a first insertion hole for removably receiving the first optical contact of the optical connection adapter, and a third optical contact inserted into the first insertion hole and fixed to the first housing so that an optical axis of the third optical contact coincides with that of the first optical contact.

The second optical socket comprises a second housing provided with a second insertion hole for removably receiving the second optical contact of the optical connection adapter, and a fourth optical contact inserted into the second insertion hole and fixed to the second housing so that an optical axis of the fourth optical contact coincides with that of the second optical contact.

DESCRIPTION OF THE PREFERRED EMBODIMENT

Figure 1:
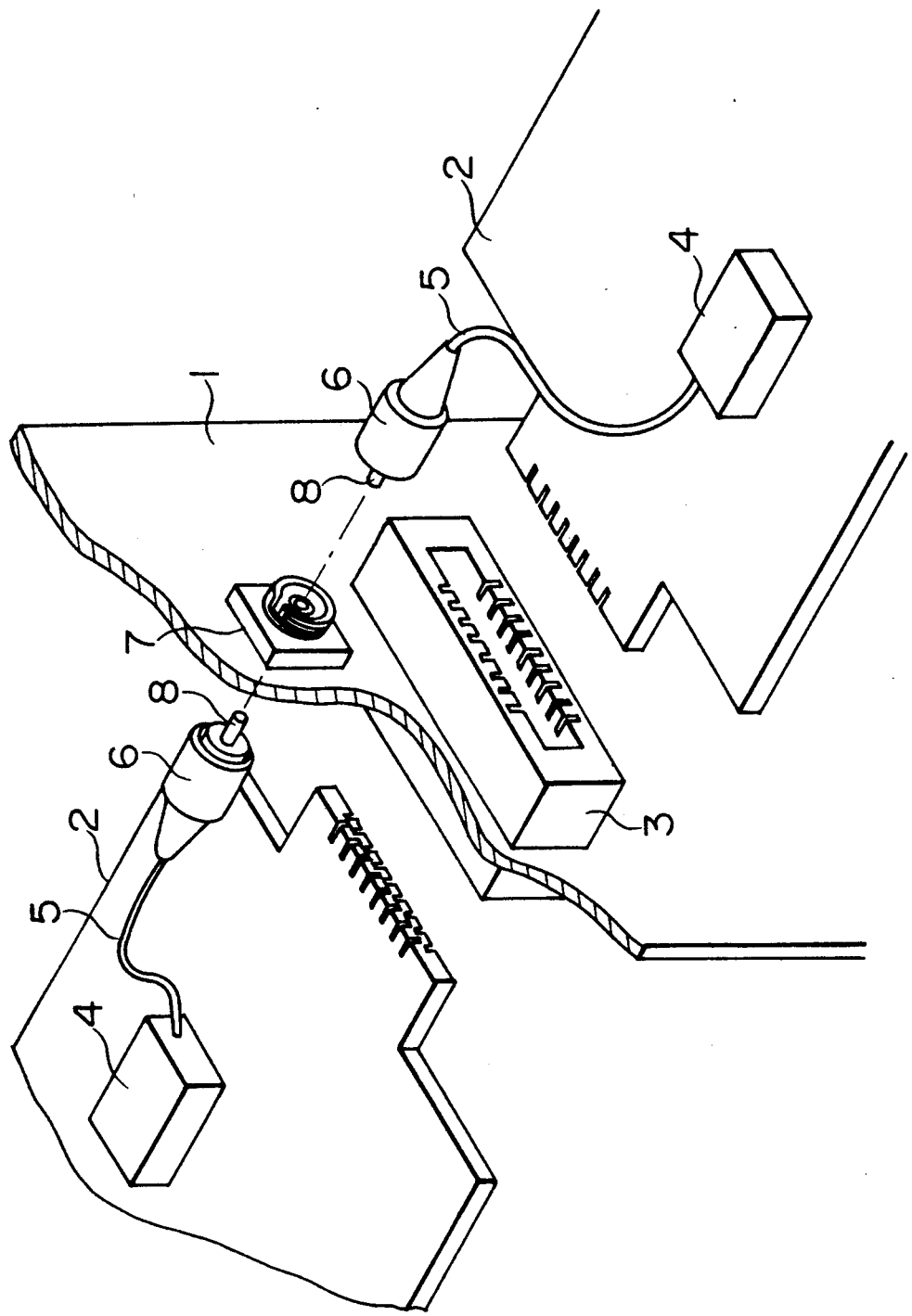
FIG. 1 is a perspective view of a conventional optical connector applied to a printed wiring board.
Figure 2:
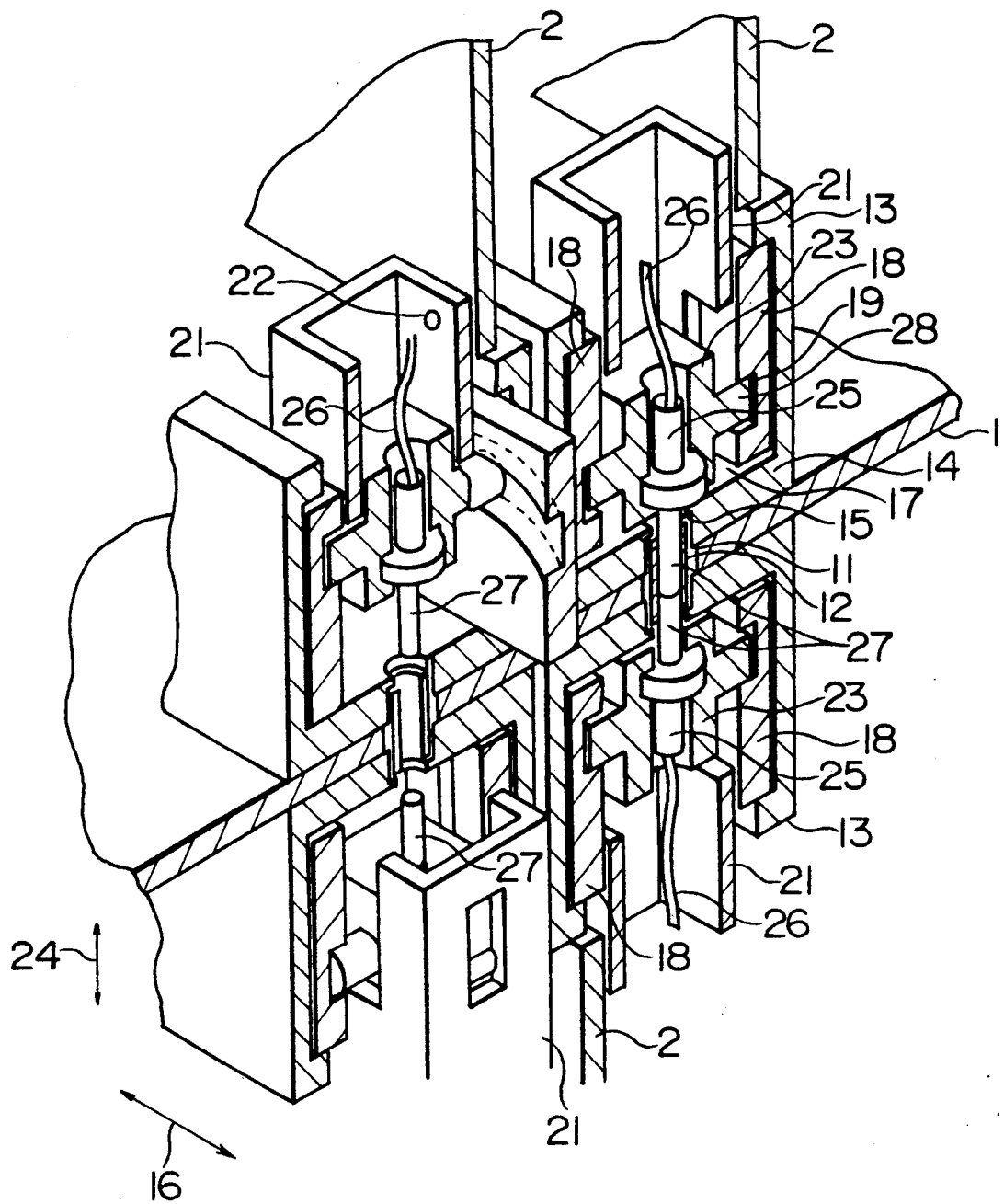
FIG. 2 is a perspective sectional view of two optical connectors according to a first embodiment of this invention when applied to a printed wiring board.

FIG. 2 is a perspective sectional view illustrating two optical connectors according to a first embodiment of this invention when applied to a printed wiring board. Description will be made as regards one optical connector alone for the purpose of simplification.

Referring to FIG. 2, a circuit board of a particular type or a printed wiring board 1 has the opposite surfaces each mounting another circuit board 2 arranged perpendicular to the printed wiring board 1. Positional relationship between those circuit boards 2 on the opposite surfaces will become clear as the description proceeds.

The printed wiring board 1 is provided with a through hole 11 in correspondence with the circuit boards 2. Practically, a plurality of the through holes 11 are formed along the circuit boards to be aligned in a straight line, although only one hole is observed in the figure. A cylindrical alignment sleeve 12 is inserted in the through hole 11 to penetrate therethrough. The alignment sleeve 12 has a length larger than the thickness of the printed wiring board 1.

A main housing 13 of an insulating material is secured to each of the opposite surfaces of the printed wiring board 1. The main housing 13 is provided with an insertion hole 15 which is formed at a portion adjacent to the printed wiring board 1, namely, a bottom portion 14 and which is for receiving an end portion of the alignment sleeve 12. The insertion hole 15 has a narrowed portion in the vicinity of the internal surface of the main housing 13. The diameter of the narrowed portion is smaller than the outer diameter of the alignment sleeve 12. Accordingly, the alignment sleeve 12 is prevented by the bottom portion 14 of the main housing 13 from being dislocated along the cylindrical axis. Specifically, the bottom portion 14 serves as a sleeve holding member for holding the alignment sleeve 12.

Figure 3:
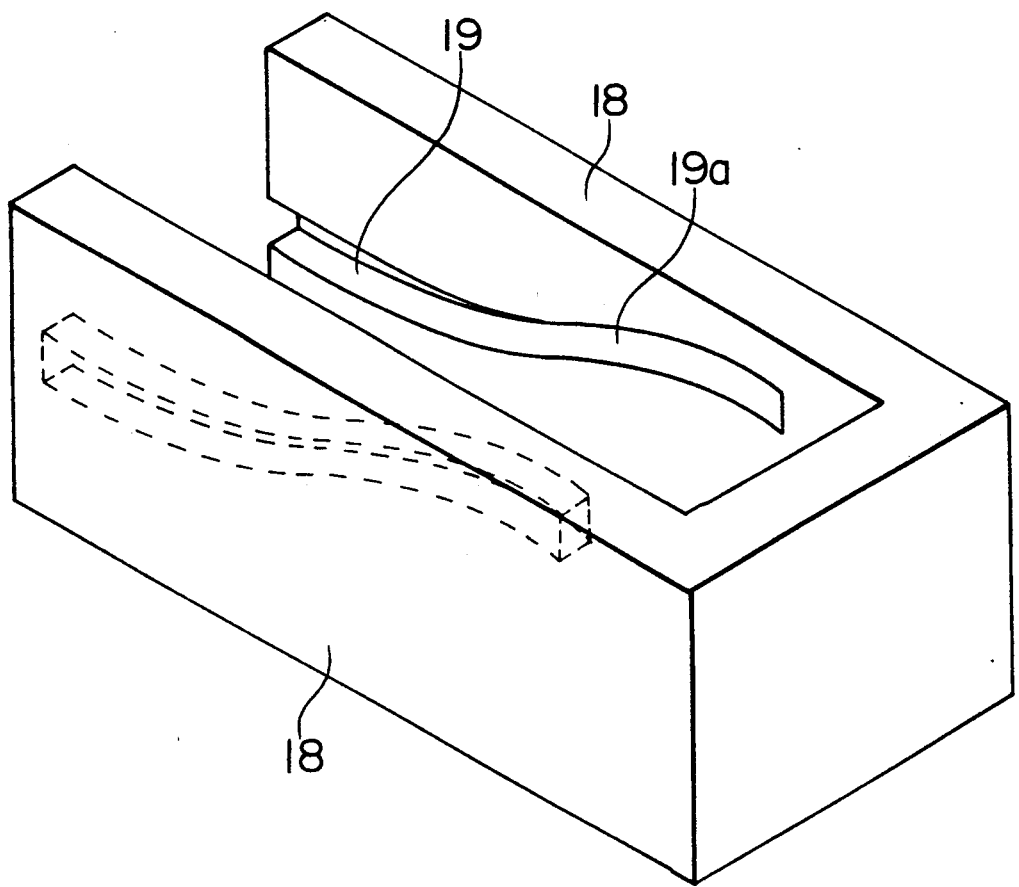
FIG. 3 is a perspective view of a slider included in the optical connector shown in FIG. 2.

The main housing 13 defines a housing groove 17 extending along a first direction 16 parallel to the printed wiring board 1 and the circuit board 2. In the main housing 13, two sliders 18 extend along the both side walls, respectively. As shown in FIG. 3, the two sliders 18 are integrally coupled to each other. The sliders 18 are slidable along the first direction 16. Each slider 18 has a cam groove 19 extending substantially along the first direction 16. The cam groove 19 has a slant portion 19a at its center portion, as shown in FIG. 3. The slant portion 19a is slanted with respect to the first direction 16.

A plug housing 21 is located between the two sliders 18. The plug housing 21 is provided with a bore 22. The plug housing 21 is fixed to the circuit board 2 through a screw (not shown) penetrating through the bore 22. Practically, a plurality of the plug housings 21 are arranged along the housing groove 17, although only one plug housing is shown in the figure.

The plug housing 21 encloses a contact holding member 23. The contact holding member 23 enclosed in the plug housing 21 is slidable along a second direction 24 perpendicular to the printed wiring board 1. The contact holding member 23 holds an optical contact 25. The optical contact 25 held by the contact holding member 23 has the optical axis coincident with the cylindrical axis of the alignment sleeve 12. An optical fiber 26 is connected to the optical contact 25. The optical fiber 26 is also connected to a converter (not shown) on the circuit board 2 so as to leave the slack. A tip 27 of the optical contact 25 has an outer diameter slightly smaller than the internal diameter of the alignment sleeve 12. The contact holding member 23 has protrusions 28 slidably inserted in the cam grooves 19 of the sliders 18. When the sliders 18 are moved along the first direction 16, The contact holding member 23 is driven along the second direction 24 in accordance with the configuration of the cam groove 19.

An optical plug is formed by a combination of the optical contact 25, the contact holding member 23, and the plug housing 21 described above. Although not clearly shown in the figure, a plurality of the optical plugs are arranged in a straight line on each circuit board 2. On the other hand, an optical connection adapter is formed by combination of the main housing 13, a plurality of the alignment sleeves 12 arranged in a straight line in the main housing 13, the sliders 18 arranged in the main housing. An optical connector unit is formed by a combination of a plurality of the optical plugs arranged in a straight line on the circuit board 2 and the optical connection adapter. In this embodiment, a first optical connector unit is located on the upper surface of the printed wiring board 1 while a second optical connector unit is located on the lower surface of the printed wiring board 1, as shown in FIG. 2. One optical connector is formed by a combination of the first optical connector unit and the second optical connector unit corresponding to the first optical connector unit.

Figure 4:
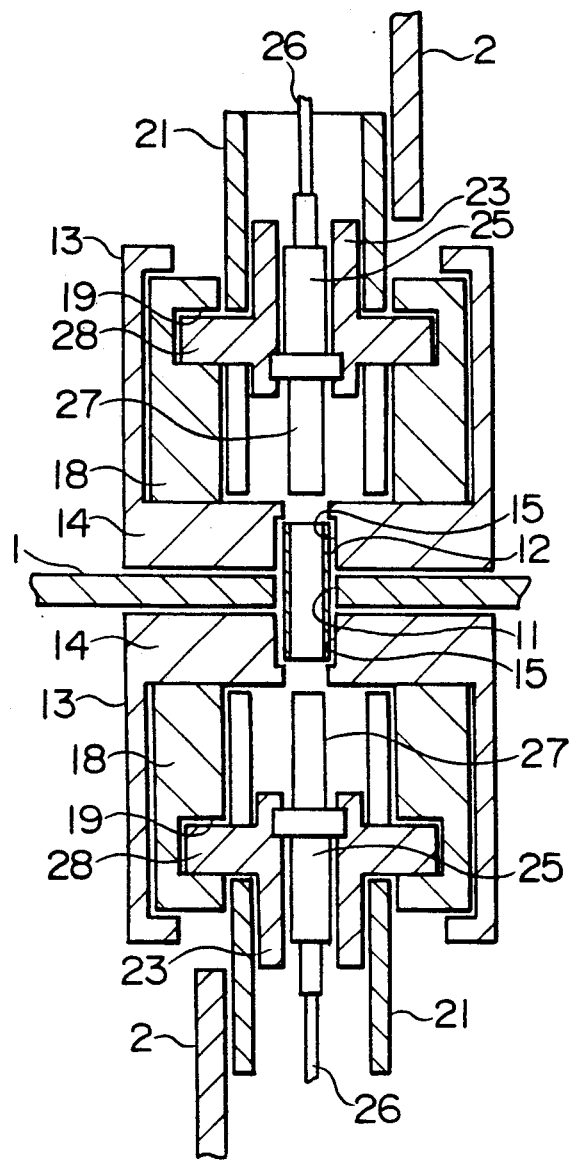
FIG. 4 is a sectional view of the optical connector shown in FIG. 2 in a disconnected state.
Figure 5:
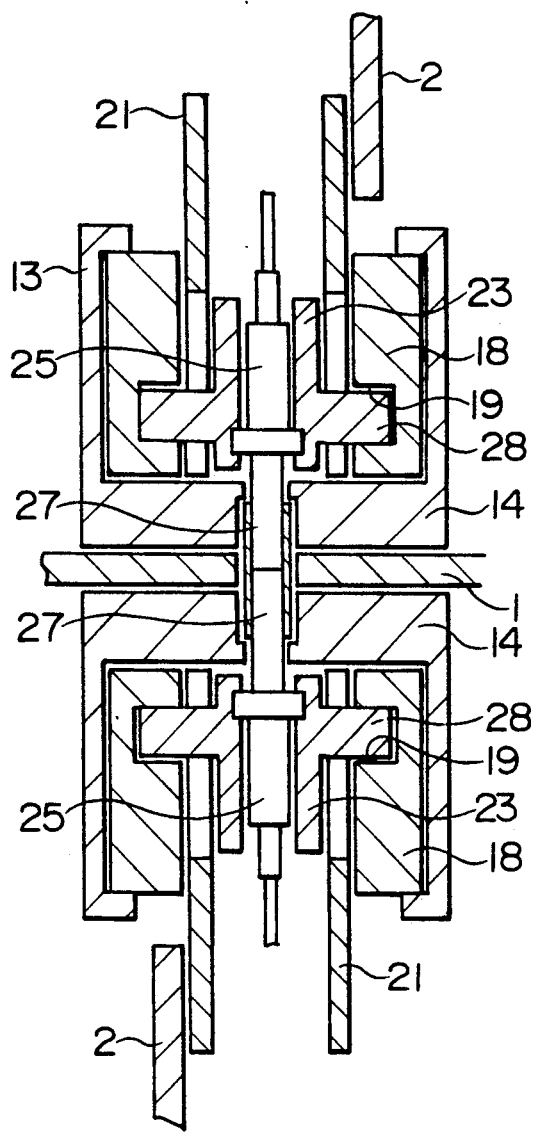
FIG. 5 is a sectional view of the optical connector shown in FIG. 2 in a connected state.

FIG. 4 shows the optical connector according to the first embodiment in a disconnected state. When the sliders 18 are moved along the first direction 16 in the disconnected state, the cam grooves 19 and the protrusions 28 are engaged with each other. At this time, the contact holding member 23 is moved towards the bottom portion 14 of the main housing 13 by the slant portions 19a of the cam grooves 19. As a result, the tip 27 of the optical contact 25 is smoothly inserted into the alignment sleeve 12. The above-mentioned operation is carried out on each of the opposite surfaces of the printed wiring board 27 to make the tip 27 of the optical contact 25 be brought into contact with that of the mating optical contact 25, as shown in FIG. 5. Thus, the optical connector is put into a connection state.

When the sliders 18 are moved in a direction opposite to the above-mentioned case while the optical connector is in a connection state, the mating optical contacts 25 are disconnected as shown in FIG. 4.

With this structure, a plurality of the mating optical contacts can be connected and disconnected by the movement of the two sliders 18. Accordingly, a relatively small space is require for connection of one optical plug. In addition, efficiency in mounting operation is improved.

Figure 6:
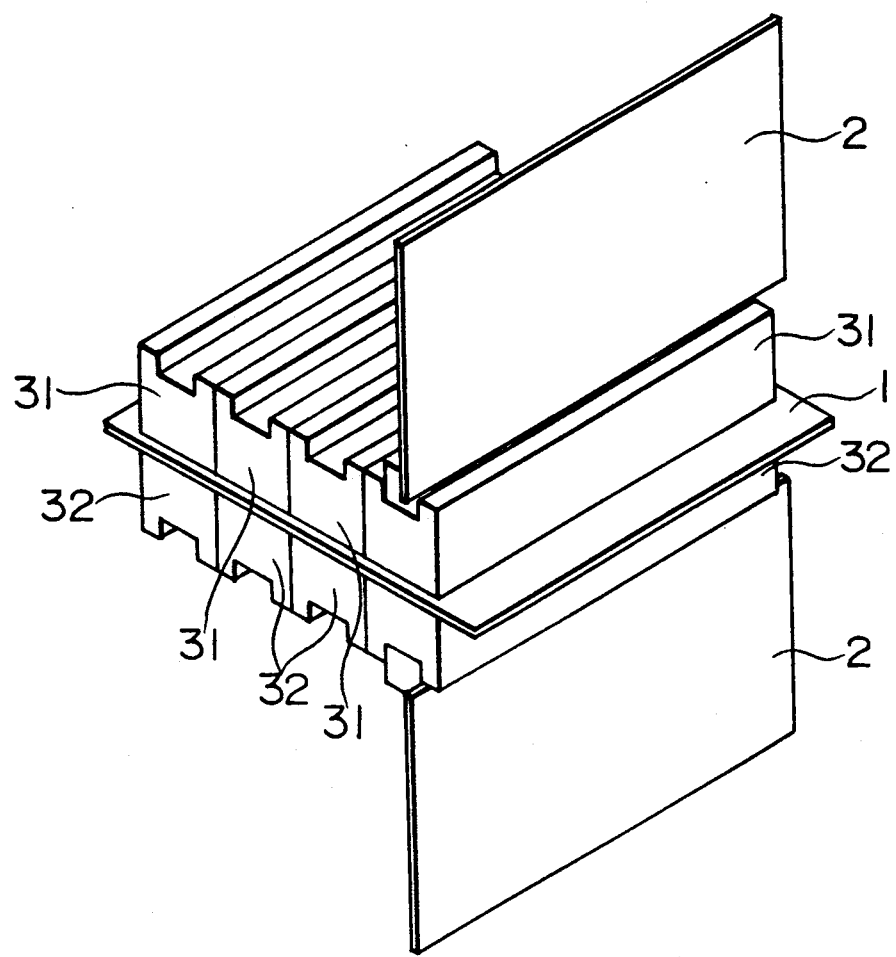
FIG. 6 is a perspective view of the entire configuration of the optical connector shown in FIG. 2.

FIG. 6 is a perspective view illustrating the entire configuration of the first embodiment shown in FIG. 2.

As is obvious from FIG. 6, a plurality of the first optical connector units 31 are arranged on the upper surface of the printed wiring board 1 in a same direction. Likewise, a plurality of the second optical connector units 32 are arranged on the lower surface of the printed wiring board 1 in a same direction. The longitudinal direction of each of the second optical connector units 32 is parallel to the longitudinal direction of each of the first optical connector units 31. Each of the second optical connector units 32 is opposite to each of the first optical connector units 31 with the printed wiring board 1 being interposed therebetween. The circuit board 2 is mounted on each of the first and the second optical connector units 31 and 32.

Figure 7:
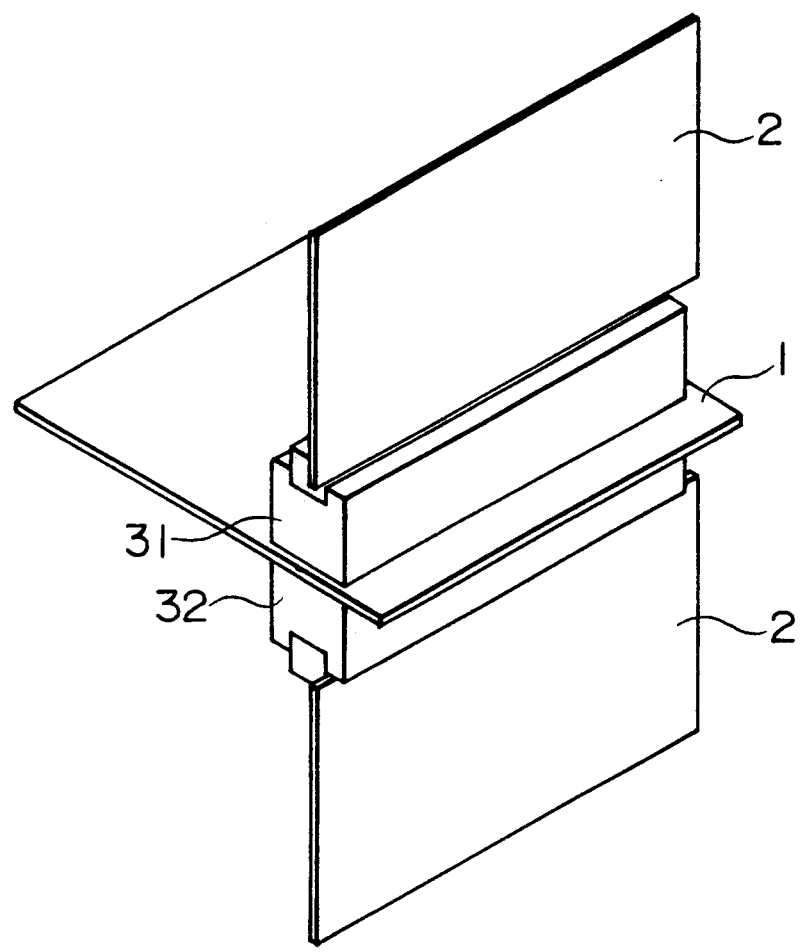
FIG. 7 is a perspective view of an optical connector according to a second embodiment of this invention.

FIG. 7 shows a perspective view illustrating the entire configuration of a second embodiment. An optical connector according to the second embodiment comprises a first and a second optical connector unit 31 and 32 similar to those of the first embodiment illustrated in FIGS. 2 through 6. However, the number of the first and the second optical connector units 31 and 32 is different from that of the first embodiment. In the second embodiment, a single first optical connector unit 31 is arranged on the upper surface of the printed wiring board 1. Likewise, a single second optical connector unit 32 is arranged on the lower surface of the printed wiring board 1. The longitudinal direction of the second optical connector unit 32 is parallel to the longitudinal direction of the first optical connector unit 31. The second optical connector unit 32 is opposite to the first optical connector unit 31 with the printed wiring board 1 interposed therebetween. The circuit board 2 is mounted on each of the first and the second optical connector units 31 and 32.

Figure 8:
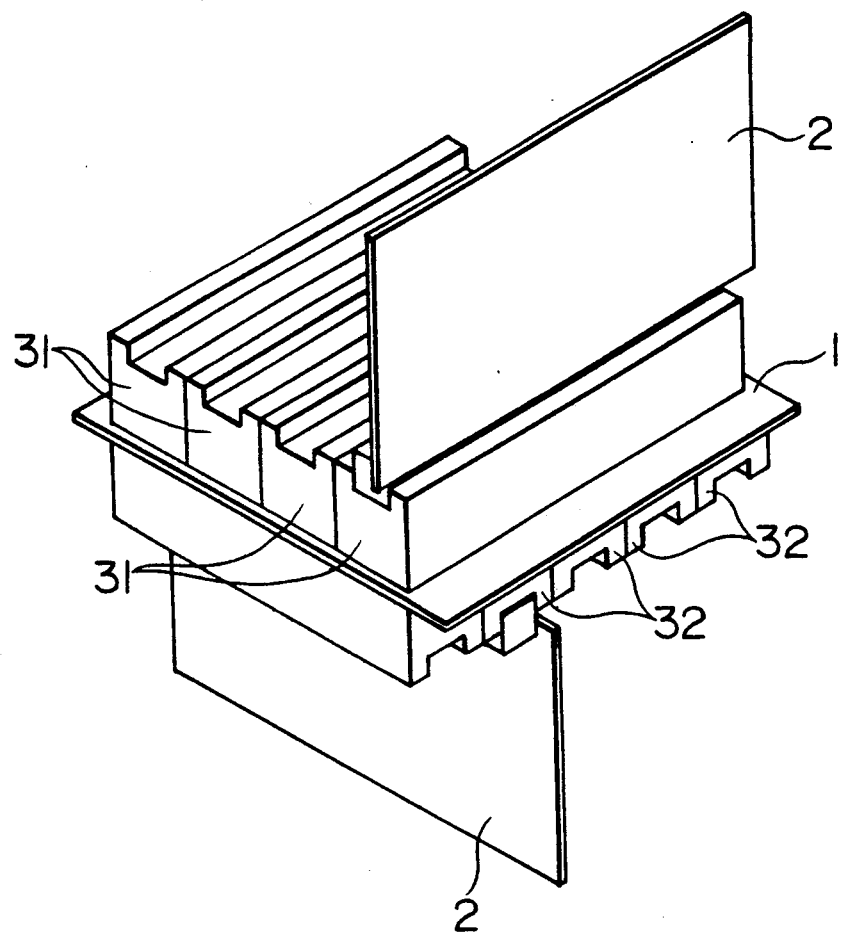
FIG. 8 is a perspective view of an optical connector according to a third embodiment of this invention.

FIG. 8 is a perspective view illustrating the entire configuration of a third embodiment. An optical connector according to the third embodiment comprises a first and a second optical connector unit 31 and 32 similar to those of the first embodiment illustrated in FIGS. 2 through 6. However, the arrangement of the first and the second optical connector units 31 and 32 is different from that of the first embodiment. In the third embodiment, a plurality of the first optical connector units 31 are arranged on the upper surface of the printed wiring board 1 in a same direction. A plurality of the second optical connector units 32 are arranged on the lower surface of the printed wiring board 1 in a same direction. As is different from the first embodiment, however, the longitudinal direction of the second optical connector unit 32 is perpendicular to the longitudinal direction of the first optical connector unit 31. Each of the second optical connector units 32 is partially opposite to each of the first optical connector units 31 with the printed wiring board 1 being interposed therebetween. The circuit board 2 is mounted on each of the first and the second optical connector units 31 and 32.

Figure 9:
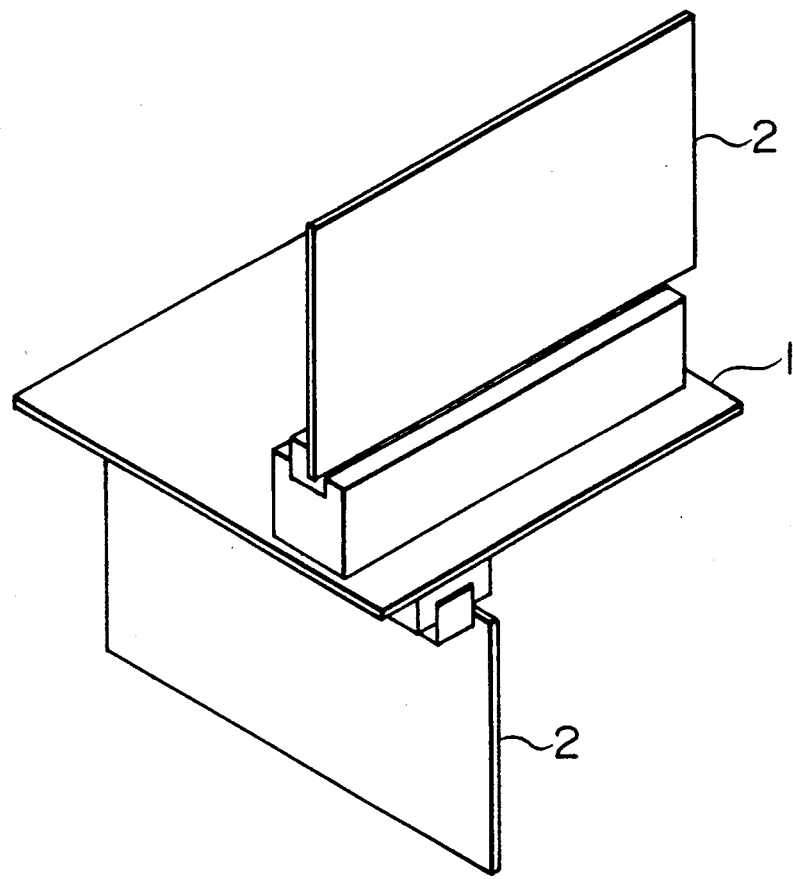
FIG. 9 is a perspective view of an optical connector according to a fourth embodiment of this invention.

FIG. 9 is a perspective view illustrating the entire configuration of a fourth embodiment. An optical connector according to the fourth embodiment comprises a first and a second optical connector unit 31 and 32 similar to those of the third embodiment shown in FIG. 8. However, the number of the first and the second optical connector units 31 and 32 is different from that of the third embodiment. In the fourth embodiment, a single first optical connector unit 31 is arranged on the upper surface of the printed wiring board 1. A single second optical connector unit 32 is arranged on the lower surface of the printed circuit board 1. The longitudinal direction of the second optical connector unit 32 is perpendicular to the longitudinal direction of the first optical connector unit 31. One end of the second optical connector unit 32 is opposite to one end of the first optical connector unit 31 with the printed circuit board 1 being interposed therebetween. The circuit board 2 is mounted on each of the first and the second optical connector units 31 and 32.

In the first embodiment, the optical connector unit comprises a plurality of the optical plugs. However, the optical connector unit may comprise only one optical plug. In the first embodiment, the optical connection adapter includes the main housing and the sliders. However, they are not necessarily required. After all, it is sufficient that the optical connection adapter is attachable to the circuit board and can hold the optical plug. In the first embodiment, the optical plug is held to the main housing through the sliders. Instead, the main housing may directly hold the optical plug to be movable along its optical axis. In the first embodiment, the sliders having the grooves are used as optical contact driving means for driving the contact holding member along the optical axis. However, the optical contact driving means may be implemented by other suitable means instead of the sliders. In the first embodiment, the optical connector unit comprises the alignment sleeve. However, the alignment sleeve is not necessarily required.

Figure 10:
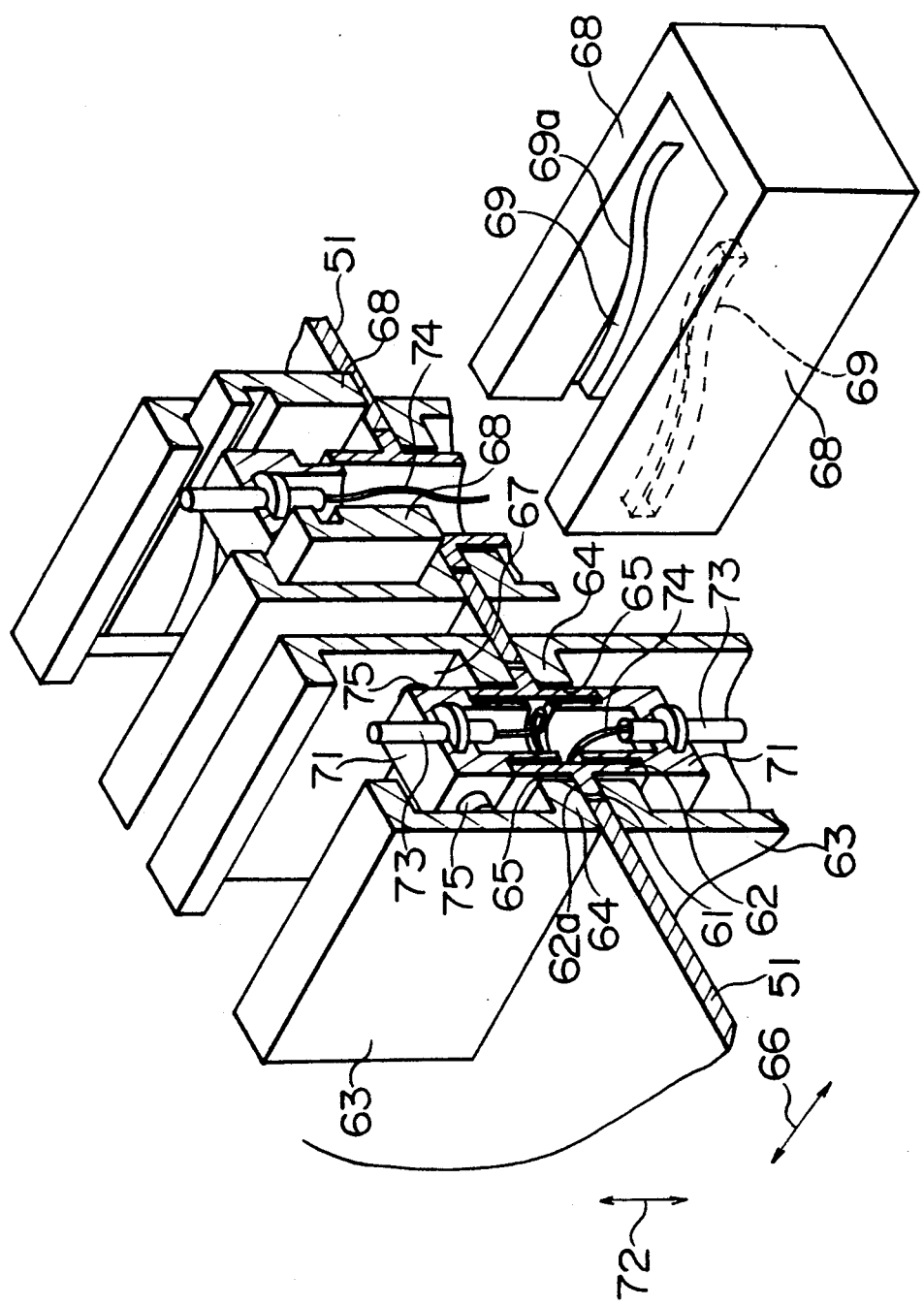
FIG. 10 is a perspective sectional view of two optical connectors according to a fifth embodiment of this invention when applied to a printed wiring board.

FIG. 10 is a perspective sectional view illustrating two optical connectors according to a fifth embodiment of this invention when applied to a printed wiring board. Description will be made as regards one optical connector along for the purpose of simplification.

Referring to FIG. 10, a circuit board of a particular type or a printed wiring board 51 is provided with a through hole 61. A pipe 62 of a cylindrical shape having a rectangular section is inserted into the through hole 61 to penetrate therethrough. The pipe 62 has a flange portion 62a. The flange portion 62a has a thickness similar to the thickness of the printed wiring board 51. Practically, a plurality of the pipes 62 are placed in each of first and second main housings 63 and 63, which will later be described, to be alined in a straight line along the longitudinal direction of the housing. However, only one pipe 62 is illustrated in the figure.

The first and the second main housings 63 and 63 of an insulating material are secured to the opposite surfaces of the printed wiring boards 51, respectively. Each main housing 63 is provided with an insertion hole 65 which is formed at a portion adjacent to the printed wiring board 51, namely, a bottom portion 64 and which is for receiving the pipe 62. The flange portion 62a of the pipe 62 is interposed between the first and the second main housings 63 and 63. Thus, the pipe 62 is fixed to the printed wiring board 51.

Each of the first and the second main housings 63 and 63 defines a housing groove 67. The housing groove 67 extends along a first direction 66 parallel to the printed wiring board 51 and a circuit board 52 (see FIGS. 17 and 18). In the main housing 63, two sliders 68 extend along the both side walls, respectively. The two sliders 68 are integrally coupled to each other. The sliders 68 are slidable along the first direction 66. Each slider 68 has a cam groove 69 extending substantially along the first direction 66. The cam groove 69 has a slant portion 69a at its center portion. The slant portion 69a is slanted with respect to the first direction 66.

One ends of first and second contact holding members 71 are inserted in the upper and the lower ends of the pipe 62, respectively. The contact holding members 71 inserted into the pipe 62 are slidable along the cylindrical axis, namely, a second direction 72 perpendicular to the printed wiring board 51. The first and the second contact holding members 71 and 71 hold first and second optical contacts 73 and 73, respectively. Each optical contact 73 held by the contact holding member 71 has the optical axis coincident with the cylindrical axis of the pipe 62. The first and the second optical contacts 73 and 73 are connected to each other through an optical fiber 74 having the sufficient slack.

The contact holding member 71 has a protrusion 75 engaged with the cam groove 69 of the slider 68. As a result, when the sliders 68 are moved along the first direction 66, the contact holding member 71 is driven along the second direction 72 in accordance with the configuration of the cam groove 69. Consequently, the optical contact 73 is driven along the second direction 72 by the contact holding member 71.

An optical fiber unit is formed by a combination of the first and the second contact holding members 71 and 71, the first and the second optical contacts 73 and 73, and the optical fiber 74. The length of the optical fiber unit in the second direction 72 is elongated and contracted with the movement of the sliders 68 along the first direction 66.

An optical connection adapter is formed by a combination of the above-mentioned optical fiber unit, the pipe 62, the first and the second main housings 63 and 63, and the sliders 68.

Figure 11:
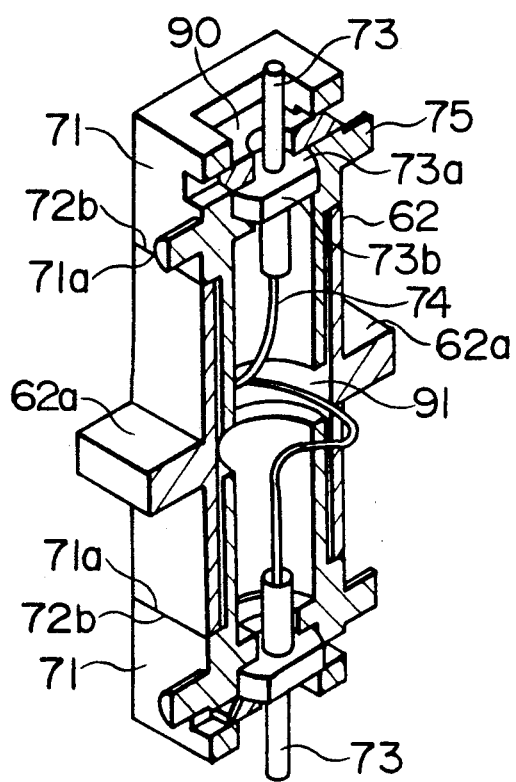
FIG. 11 is a perspective sectional view of an optical connection adapter of the optical connector in FIG. 10 in a most contracted state.
Figure 12:
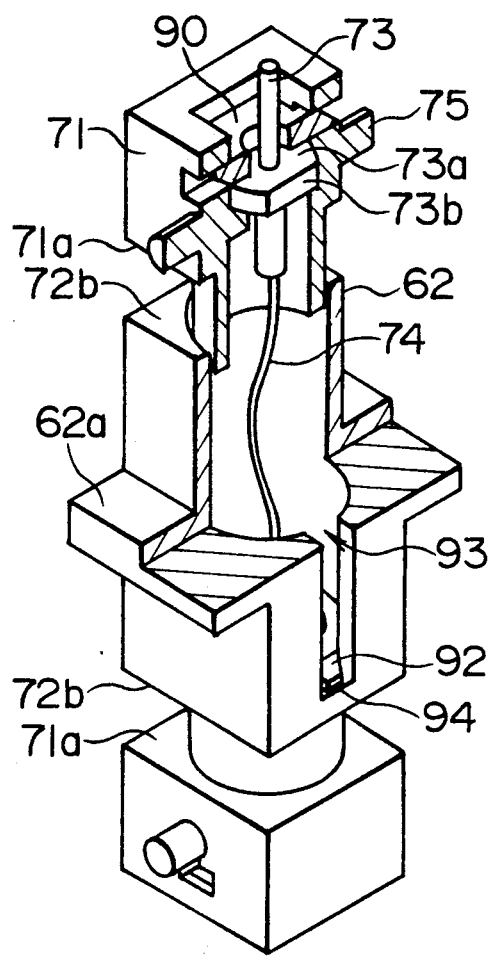
FIG. 12 is a perspective sectional view of the optical connection adapter of the optical connector in FIG. 10 in a most elongated state.
Figure 13:
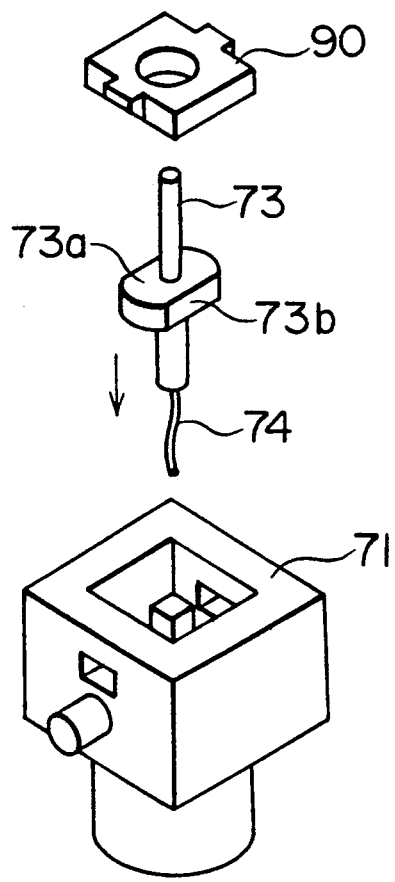
FIG. 13 is a perspective disassembled view of a main portion of the optical connection adapter of the optical connector shown in FIG. 10.

FIG. 11 is a perspective sectional view of the optical connection adapter in the fifth embodiment shown in FIG. 10 in a most contracted state. FIG. 12 is a perspective sectional view of the optical connection adapter in the same embodiment in a most elongated state. FIG. 13 is a perspective disassembled view of a main portion of the optical connection adapter in the same embodiment.

Referring to FIGS. 11 through 13, detailed description will be made as regards an optical fiber unit which is a part of the optical connection adapter. As described above, the optical fiber unit comprises the first and the second optical contacts 73 and 73, the optical fiber 74, and the first and the second contact holding members 71 and 71. The optical fiber 74 has a spiral shape.

The first and the second optical contacts 73 and 73 are fixed by a fixing plate 90 in the first and the second contact holding members 71 and 71. When the optical fiber unit is contracted at maximum, one end 71a of each contact holding member 71 and an end of the pipe 62 are brought into contact with each other. Thus, the optical fiber unit is prevented from being further contracted. When the optical fiber unit is contracted at maximum, a space 91 is produced between the contact holding member 71. Thus, the optical fiber 74 can get rid of the mechanical stress when the optical fiber unit is contracted.

As shown in FIG. 12, when the optical fiber unit is elongated at maximum, a protrusion 92 formed on the side wall of the contact holding member 71 is brought into contact with a bottom portion 94 of a groove 93 formed in the pipe 62 for receiving the projection 92. Thus, the optical fiber unit is prevented from being further elongated. At that time, the optical fiber 74 is made to be slightly slack as compared with the tensive state.

As shown in FIG. 13, each optical contact 73 has a flange portion 73a. The flange portion 73a has a cut-off portion 73b.

Figure 14:
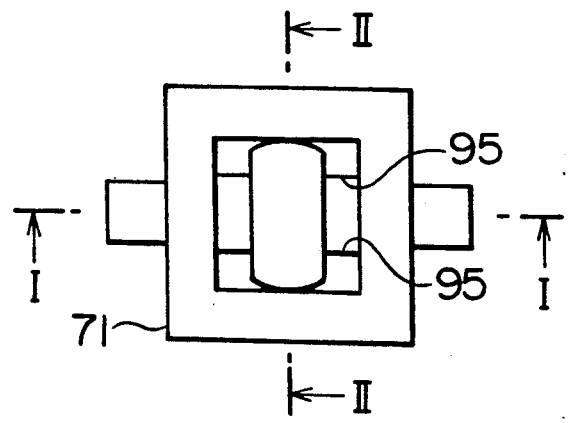
FIG. 14 is a plan view of a contact holding member of the optical connector shown in FIG 10.
Figure 15:
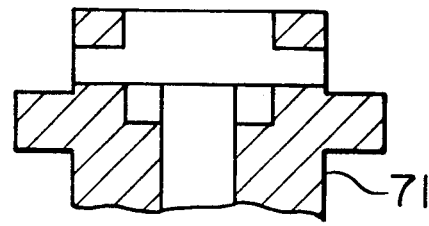
FIG. 15 is a sectional view taken along a line I—I in FIG. 14.
Figure 16:
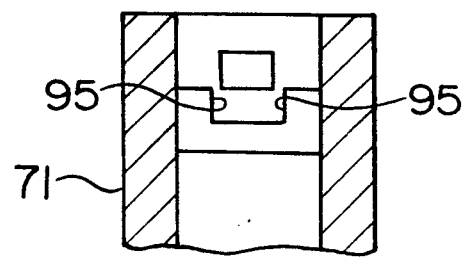
FIG. 16 is a sectional view taken along a line II—II in FIG. 14.

As shown in FIGS. 14 through 16, each contact holding member 71 has an inner wall surface 95 formed to receive the flange portion 73a. The inner wall surface 95 is made to engage the flange portion 73a of the optical contact 73. The inner wall surface 95 prevents the rotation of the optical contact 73 when the optical fiber unit is elongated and contracted.

Thus, the rotation of each optical contact 73 is avoided. In this embodiment, the optical fiber 74 may preliminarily be twisted when the second optical contact 73 is fixed to the second contact holding member 71 after the first optical contact 73 is fixed to the first contact holding member 71. In this state, the second optical contact 73 is fixed to the second contact holding member 71. By preliminarily twisting the optical fiber 74 as mentioned above, optical fiber 74 is prevented from being substantially twisted when the optical fiber 74 is elongated along the optical axis of the optical contact 73. In this embodiment, the optical fiber 74 contracted at maximum is preliminarily twisted in an optically allowable extent in a direction opposite to that of the twisting movement occurring when the optical fiber 74 is elongated. Thus, by preliminarily twisting the optical fiber 74, it is possible to effectively disperse the stress produced in the optical fiber 74 when the optical fiber unit is elongated and contracted.

Although it is preferably to preliminarily twist the optical fiber 74 as described in this embodiment, the optical fiber is not necessarily twisted preliminarily.

Figure 17:
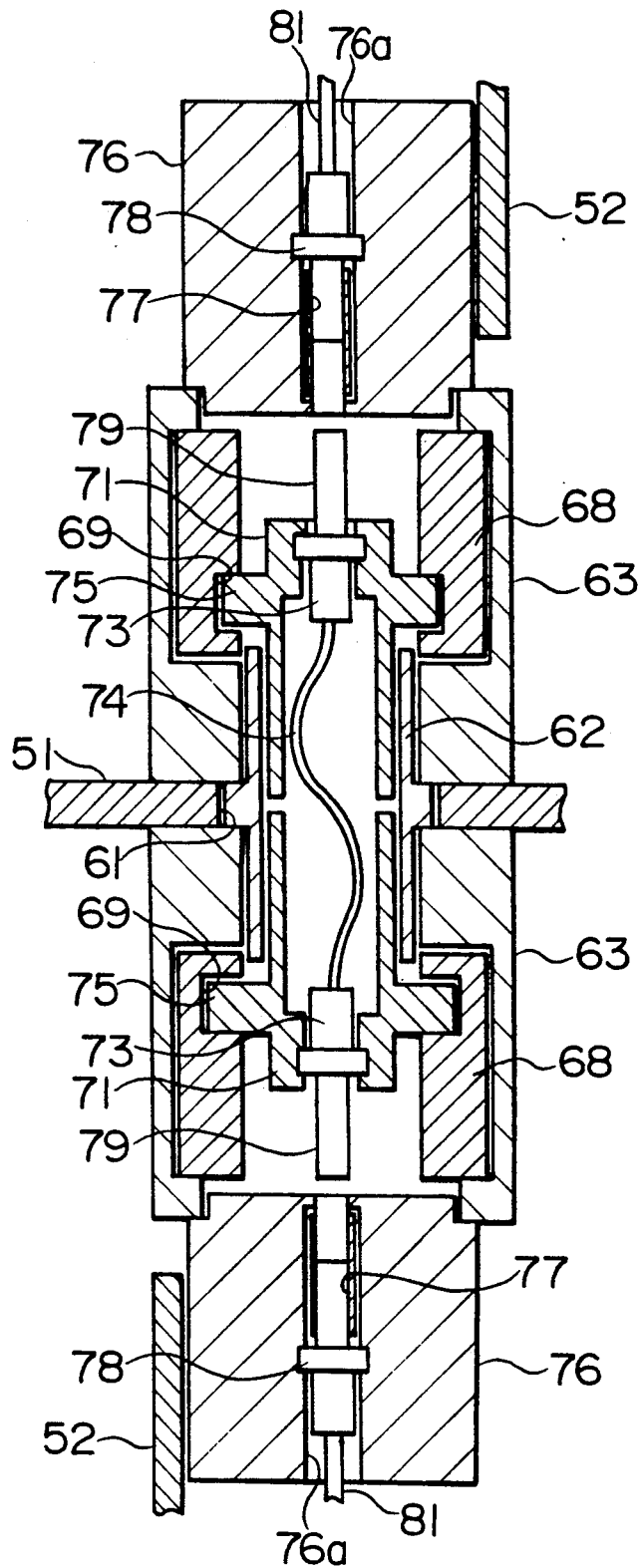
FIG. 17 is a sectional view illustrating the optical connector in FIG. 10 in a disconnected state.
Figure 18:
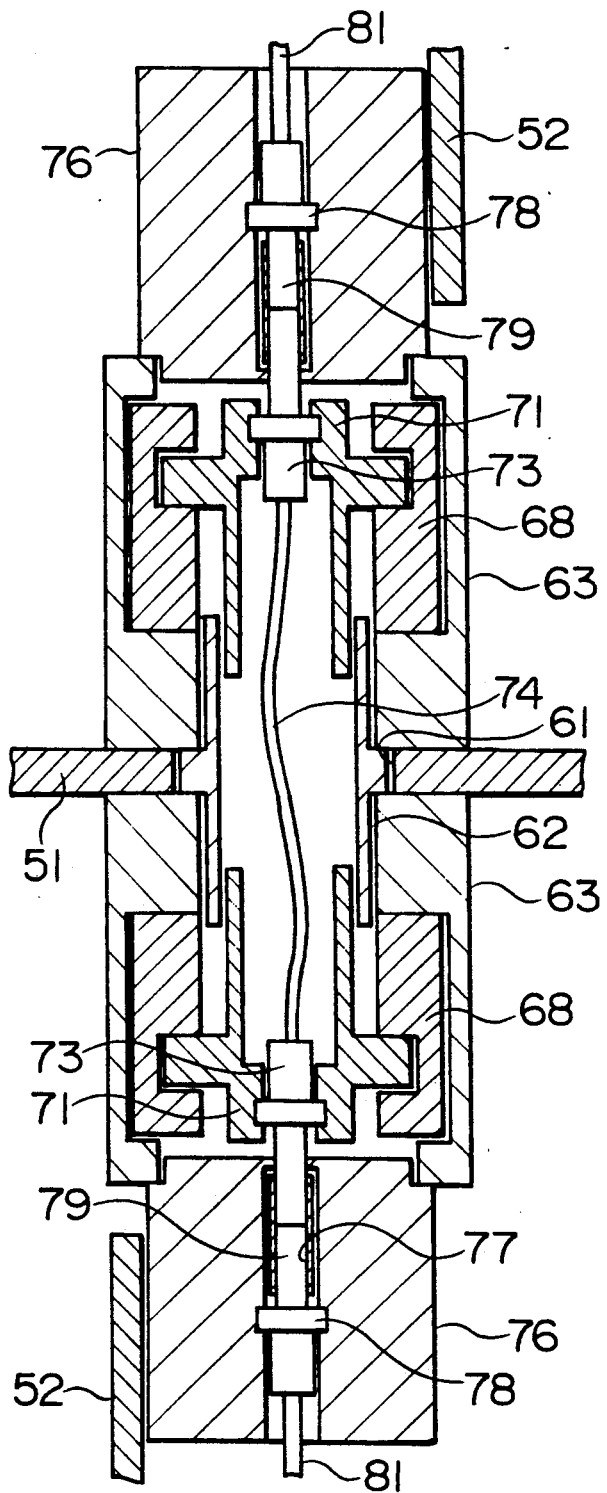
FIG. 18 is a sectional view illustrating the optical connector in FIG. 10 in a connected state.

More detailed description will now be made as regards the optical connector according to this embodiment. Referring to FIGS. 17 and 18, the printed wiring board 51 has the opposite surfaces each mounting the circuit board 52 arranged perpendicularly to the printed wiring board 51. Positional relationship between the circuit boards 52 on the opposite surfaces will become clear as the description proceeds.

Socket housings 76 of an insulating material are located at the upper and the lower portions of the above-mentioned optical connection adapter, respectively. Each socket housing 76 is fixed to the circuit board 52. The first socket housing 76 is provided with a bore 76a. An alignment sleeve 77 is inserted into the bore 76a. The alignment sleeve 77 serves as a first insertion hole for removably receiving the first optical contact 73. One end of a third optical contact 78 is inserted into the alignment sleeve 77 to be fixed. The third optical contact 78 fixed to the first socket housing 76 has the optical axis coincident with the optical axis of the first optical contact 73. A first optical socket is formed by a combination of the first socket housing 76, the alignment sleeve 77, and the third optical contact 78 mentioned above. Likewise, the second socket housing 76 is provided with the bore 76a. The alignment sleeve 77 is inserted into the bore 76a. The alignment sleeve 77 serves as a second insertion hole for removably receiving the second optical contact 73. One end of a fourth optical contact 78 is inserted into the alignment sleeve 77 to be fixed. The fourth optical contact 78 fixed to the second socket housing 76 has the optical axis coincident with the optical axis of the second optical contact 73. A second optical socket is formed by a combination of the second socket housing 76, the alignment sleeve 77, and the fourth optical contact 78 mentioned above.

Each alignment sleeve 77 has an inner diameter slightly larger than the outer diameter of a tip portion 79 of the mating optical contact 78. An optical fiber 81 is connected to each of other ends of the third and the fourth optical contact 78.

An optical connector is formed by a combination of the optical connection adapter and the first and the second optical sockets mentioned above.

FIG. 17 shows the above-mentioned optical connector in a disconnected state. When the sliders 68 are moved along the first direction 66 in the disconnected state, the cam groove 69 and the protrusion 75 are engaged with each other. At that time, the contact holding member 71 is moved by the slant portion 69a of the cam groove 69 in a direction away from the printed wiring board 51. As a result, the tip 79 of the optical contact 73 is smoothly inserted into the alignment sleeve 77. The above-mentioned operation is carried out on each of the opposite surfaces of the printed wiring board 51 to make the tip 79 of the optical contact 73 be brought into contact with that of the mating optical contact 78, as shown in FIG. 18. Thus, the optical connector is put into a connection state.

When the sliders 68 are moved in a direction opposite to the above-mentioned case while the optical connector is in a connection state, the mating optical connectors are disconnected as shown in FIG. 17.

With this structure, a plurality of the mating optical connectors can be connected and disconnected by the movement of a pair of the sliders 68 coupled to each other. Accordingly, a relatively small space is required for connection of one optical socket. In addition, efficiency in mounting operation is improved.

Figure 19:
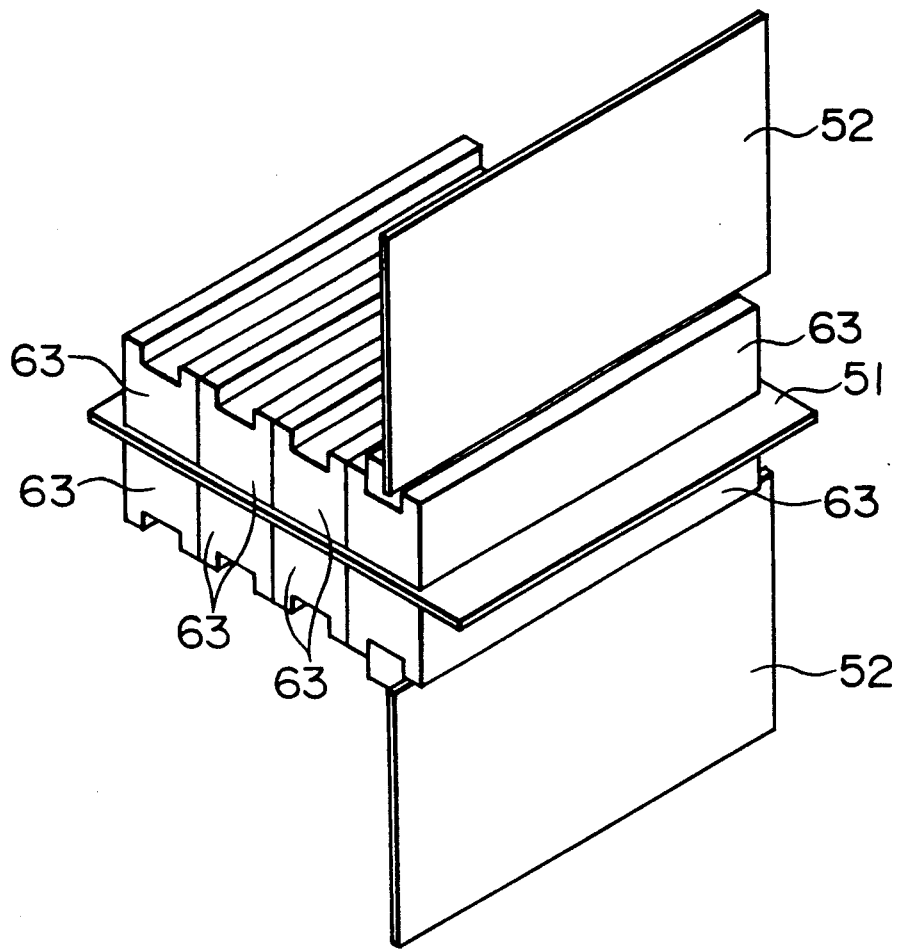
FIG. 19 is a perspective view of the entire configuration of the optical connector shown in FIG. 10.

FIG. 19 is a perspective view illustrating the entire configuration of the fifth embodiment shown in FIG. 10. As is obvious from FIG. 19, a plurality of the first main housings 63 are arranged on the upper surface of the printed wiring board 51 in a same direction. Likewise, a plurality of the second main housings 63 are arranged on the lower surface of the printed wiring board 51 in a same direction. The longitudinal direction of each of the second main housings 63 is parallel to the longitudinal direction of each of the first main housings 63. Each of the second main housings 63 is opposite to each of the first main housing 63 with the printed wiring board 51 being interposed therebetween. Thus, in this embodiment, a plurality of the optical connectors are applied to the printed wiring board 51.

Figure 20:
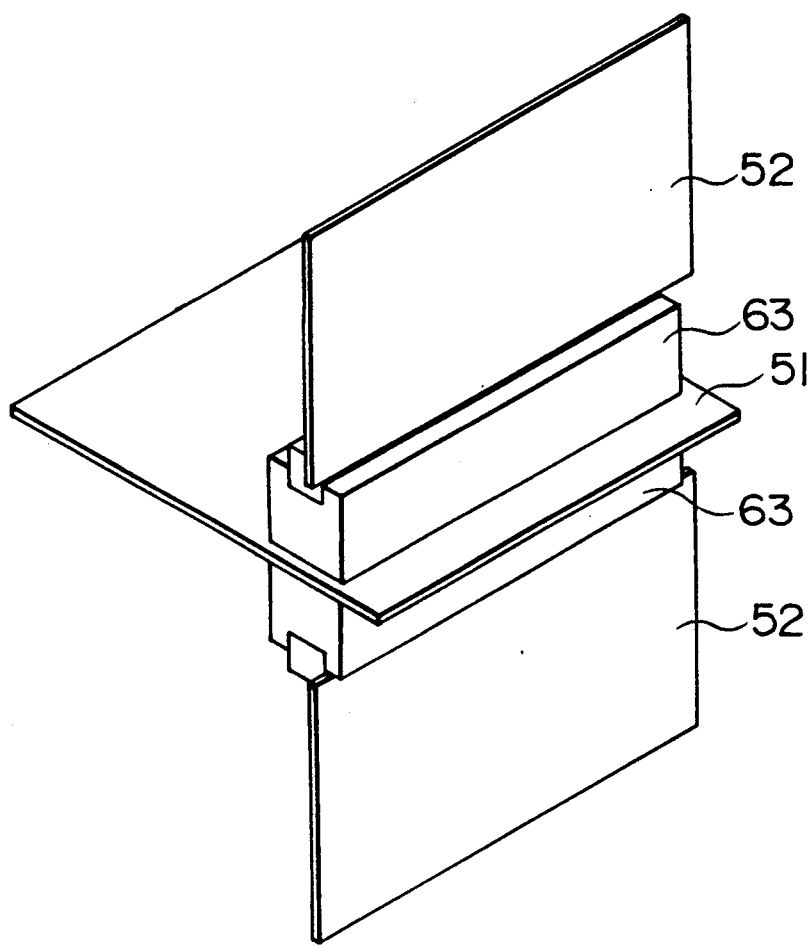
FIG. 20 is a perspective view of an optical connector according to a sixth embodiment of this invention.

FIG. 20 is a perspective view illustrating the entire configuration of a sixth embodiment. An optical connector according to the sixth embodiment comprises an optical connection adapter, a first and a second optical socket, and a first and a second main housing 63 and 63 similar to those of the fifth embodiment shown in FIGS. 10 through 19. However, the number of those components is different from that of the fifth embodiment. In the sixth embodiment, a single pair of the mating optical connectors are applied to the printed wiring board 51.

Figure 21:
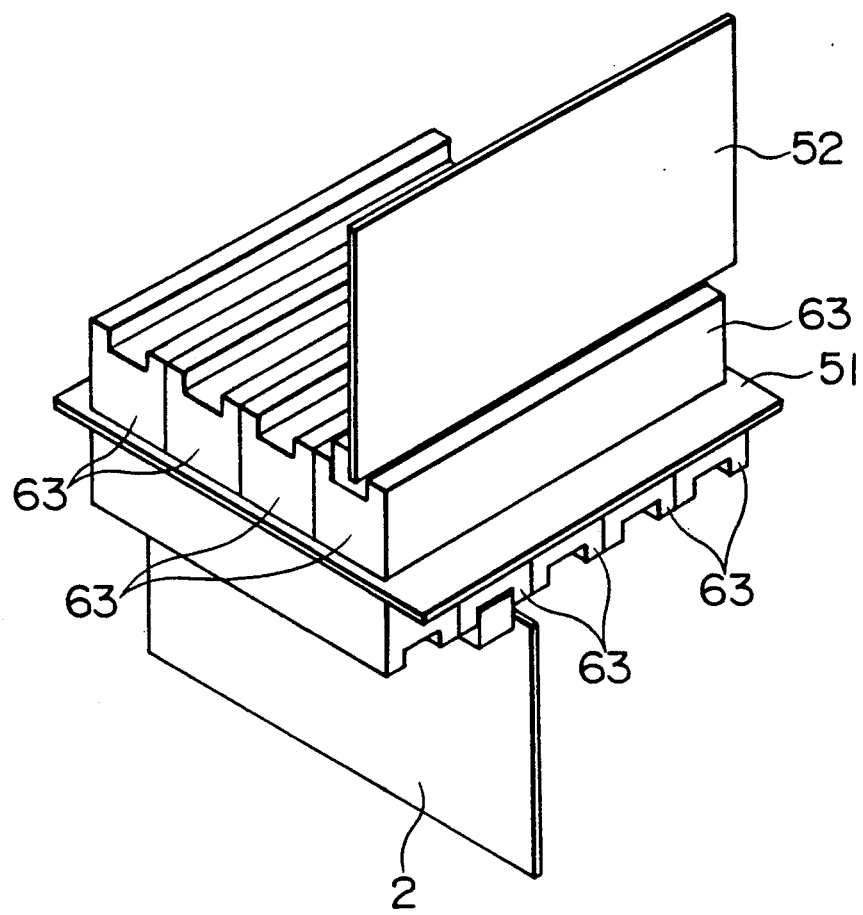
FIG. 21 is a perspective view of an optical connector according to a seventh embodiment of this invention.

FIG. 21 is a perspective view illustrating the entire configuration of a seventh embodiment. An optical connector according to the seventh embodiment comprises an optical connection adapter, a first and a second optical socket, and a first and a second main housing 63 and 63 similar to those of the fifth embodiment shown in FIGS. 10 through 19. However, the arrangement of the first and second main housings 63 and 63 is different from that of the fifth embodiment. In the seventh embodiment, a plurality of the first main housings 63 are arranged on the upper surface of the printed wiring board 51 in a same direction. Likewise, a plurality of the second main housings 63 are arranged on the lower surface of the printed wiring board 1 in a same direction. As is different from the fifth embodiment, however, the longitudinal direction of the second main housing 63 is perpendicular to the longitudinal direction of the first main housing 63. The second main housing 63 is partially opposite to the first main housing 63 with the printed wiring board 51 being interposed therebetween.

Figure 22:
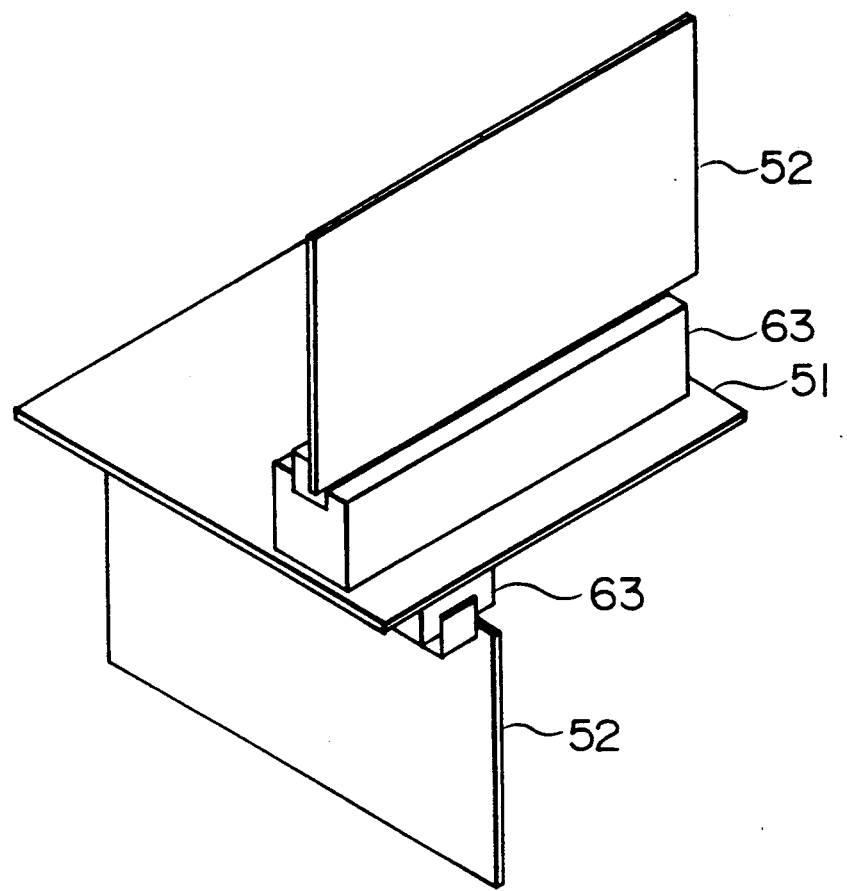
FIG. 22 is a perspective view of an optical connector according to an eighth embodiment of this invention.

FIG. 22 is a perspective view illustrating the entire configuration of an eighth embodiment. An optical connector according to the eighth embodiment comprises an optical connection adapter, a first and a second optical socket, and a first and a second main housing 63 similar to those of the seventh embodiment shown in FIG. 7. However, the number of the optical connectors is different from that of the seventh embodiment. In the eighth embodiment, a single optical connector is applied to the printed wiring board 51.

In the fifth embodiment, the optical connector comprises a plurality of the optical connection adapters. However, the optical connector may comprise only one optical connection adapter. In the fifth embodiment, the optical connector comprises a plurality of the optical sockets. However, the optical connector may comprise a pair of optical sockets arranged at both ends of the optical connection adapter. In the fifth embodiment, the optical connector comprises the main housing and the sliders. However, they are not necessarily required. In the first embodiment, the optical socket is held through the sliders to the main housing. Instead, the main housing may directly hold the optical socket. In the fifth embodiment, the sliders having the grooves are used as optical contact driving means for driving the contact holding member along the optical axis. However, the optical contact driving means may be implemented by other suitable means instead of the sliders.

As thus far been described, according to this invention, it is possible to provide an optical connector which requires a relatively small space per one optical connectors and which can improve efficiency in mounting operation and an optical connection adapter for use in mounting the optical connector.

In addition, an optical fiber unit according to this invention has a reduced optical loss because the optical fiber is not substantially twisted when it is elongated.

What is claimed is:

1. An optical connector unit including:
   an optical plug comprising an optical contact connected to an optical cable, a contact holding member for holding said optical contact, and a housing for supporting said contact holding member to be movable along an optical axis of said optical contact; and
   an optical connection adapter to be attached on a circuit board for holding said optical plug on said circuit board, said optical connection adapter including a main housing to be attached to said circuit board and optical contact driving means movable in said main housing and engaged with said contact holding member for driving said contact holding member along said optical axis, said optical contact driving means being a slider having a groove engaged with said contact holding member so as to drive said contact holding member along said optical axis.

2. An optical connector unit as claimed in claim 1, wherein said main housing is provided at a portion adjacent to said circuit board with a sleeve for removably receiving said optical contact.

3. An optical connector of a feedthrough type, comprising a first optical connector unit to be attached on one surface of a circuit board and a second optical connector unit to be attached on the opposite surface of said circuit board in correspondence with said first optical connector unit, said first and said second optical connector units having optical contacts which are adapted to be connected to each other via a through hole formed in said circuit board, wherein:

each of said first and said second optical connector units including:

an optical plug comprising the optical contact connected to an optical cable, a contact holding member for holding said optical contact, and a housing for supporting said contact holding member to be movable along an optical axis of said optical contact; and an optical connection adapter to be attached on said circuit board at the through hole for holding said optical plug whereby the optical contacts of said first and said second optical connector units are connected to each other through said through hole.

4. An optical connector as claimed in claim 3, wherein said optical connection adapter of said first optical connector unit comprises a first main housing to be attached on one surface of said circuit board and first optical contact driving means movable in said first main housing and engaged with said contact holding member of said first optical connector unit, and said optical connection adapter of said second optical connector unit comprises a second main housing to be attached on the opposite surface of said circuit board and second optical contact driving means movable in said second main housing and engaged with said contact holding member of said second optical connector unit.

5. A multi-core optical connector of a feedthrough type, comprising a first optical connector unit to be attached on one surface of a circuit board and a second optical connector unit to be attached on the opposite surface of said circuit board in correspondence with said first optical connector unit, said first and said second optical connector units having optical contacts connected to optical cables, said optical contacts of said first optical connector unit being adapted to be connected to the corresponding optical contacts of said second optical connector unit via through holes formed along a straight line in said circuit board, wherein:

each of said first and said second optical connector units including:

a plurality of optical plugs each of which comprises an individual one of said optical contacts, a contact holding member for holding said optical contact, and a housing for supporting said contact holding member to be movable along an optical axis of said optical contact; and an optical connection adapter to be attached on said circuit board for holding said optical plug;

a plurality of said optical plugs being aligned in a straight line;

said optical connection adapter receiving a plurality of said optical plugs aligned in the straight line;

each of said optical contacts of said first and said second optical connector units being movable back and forth with respect to said through hole formed in said circuit board.

6. A multi-core optical connector of a feedthrough type as claimed in claim 5, wherein:

said first and said second optical connector units are attached to said circuit board to be opposite to and in parallel with each other.

7. A multi-core optical connector as claimed in claim 6, wherein:

said first and said second optical connector units are attached to said circuit board to intersect with each other with said circuit board being interposed therebetween.

8. An optical connector as claimed in claim 5, wherein said optical connection adapter of said first optical connector unit comprises a first main housing to be attached on one surface of said circuit board and first optical contact driving means movable in said first main housing and engaged with said contact holding member of said first optical connector unit, and said optical connection adapted of said second optical connector unit comprises a second main housing to be attached on the opposite surface of said circuit board and second optical contact driving means movable in said second main housing and engaged with said contact holding member of said second optical connector unit.

9. An optical connection adapter for use in a multi-core optical connector of a feedthrough type for connecting a pair of optical connector units via a through hole formed in a circuit board having two oppositely disposed surfaces, said adapter including a pipe to be attached into the through hole of the circuit board so as to extend from one of said surfaces to the opposite one of said surfaces of said circuit board, an optical fiber in said pipe, a first and a second optical contact connected to opposite ends of said optical fiber, respectively, said first and said second optical contacts being adapted to be connected to said pair of optical connector units, respectively, and a first and a second contact holding member for holding said first and said second optical contacts, respectively, and coupled to said pipe to be movable along a cylindrical axis of said pipe.

10. An optical connection adapter as claimed in claim 9, wherein said optical fiber is a spiral and is in a relaxed state when said first and said second optical contacts are located at a maximum distance from each other.

11. An optical connection adapter as claimed in claim 10, wherein each of first and said second contact holding members has a rotation stopper for preventing dislocation of the corresponding one of said first and said second optical contacts resulting from any stress produced in said optical fiber when either of said first and said second optical fibers is moved along its optical axis.

12. An optical connection adapter as claimed in claim 10, wherein said optical fiber is preliminarily twisted in an optically allowable extent so as to disperse stress produced in said optical fiber when said optical fiber is elongated along said optical axis.

13. An optical connection adapter as claimed in claim 10, wherein said optical fiber is preliminarily twisted in an optically allowable extent so as to prevent said optical fiber from being substantially twisted when said optical fiber is elongated along said optical axis.

14. An optical connector comprising:

an optical connection adapter including a pipe to be attached to a through hole of a circuit board so as to extend from one surface to other surface of said circuit board, an optical fiber inserted into said pipe, a first and a second optical contact connected to opposite ends of said optical fiber, respectively, and a first and a second contact holding member for holding said first and said second optical contacts, respectively, and coupled to said pipe to be movable along a cylindrical axis of said pipe;

a first optical socket having a first housing provided with a first insertion hole for removably receiving the first optical contact of said optical connection adapter, and a third optical contact inserted into said first insertion hole and fixed to said first housing so that an optical axis of said third optical contact coincide with that of said first optical contact; and a second optical socket having a second housing provided with a second insertion hole for removably receiving the second optical contact of said optical connection adapter, and a fourth optical contact inserted into said second insertion hole and fixed to said second housing to that an optical axis of said fourth optical contact coincides with that of said second optical contact.

15. A multi-core optical connector comprising:

a plurality of optical connection adapters each of which includes a pipe to be attached to a through hole of a circuit board so as to extend from one surface to other surface of said circuit board, an optical fiber inserted into said pipe, a first and a second optical contact connected to opposite ends of said optical fiber, respectively, and a first and a second contact holding member for holding said first and said second optical contact, respectively, and coupled to said pipe to be movable along a cylindrical axis of said pipe;

a first optical socket having a first housing provided with a first insertion hole for removably receiving the first optical contact of said optical connection adapter, and a third optical contact inserted into said first insertion hole and fixed to said first housing so that an optical axis of said third optical contact coincides with that of said first optical contact;

a second optical socket having a second housing provided with a second insertion hole for removably receiving said second optical contact of said optical connection adapter, and a fourth optical contact inserted into said second insertion hole and fixed to said second housing so that an optical axis of said fourth optical contact coincides with that of said second optical contact;

optical contact driving means engaged with said first and said second contact holding members for driving said first and said second contact holding members along said optical axis;

a first main housing to be attached to one surface of said circuit board for slidably supporting said contact driving means; and a second main housing to be attached to other surface of said circuit board for slidably supporting said optical contact driving means;

a plurality of said optical connection adapters being aligned in a straight line in each of said first and said second main housings.

16. A multi-core optical connector as claimed in claim 15, wherein:

said first and said second main housings are attached to said circuit board to be opposite to and in parallel with each other.

17. A multi-core optical connector as claimed in claim 15, wherein:

said first and said second main housings are attached to said circuit board to intersect with each other with said circuit board being interposed therebetween.

* * * * *